United States Patent
Ho et al.

(10) Patent No.: US 10,949,957 B2
(45) Date of Patent: Mar. 16, 2021

(54) BIOMETRIC IMAGE PROCESSING METHOD AND ELECTRONIC DEVICE THEREOF

(71) Applicant: Gingy Technology Inc., Hsinchu (TW)

(72) Inventors: Shih-Ju Ho, Hsinchu (TW); Chih-I Cheng, Hsinchu (TW)

(73) Assignee: Gingy Technology Inc., Hsinchu (TW)

( * ) Notice: Subject to any disclaimer, the term of this patent is extended or adjusted under 35 U.S.C. 154(b) by 179 days.

(21) Appl. No.: 16/167,551

(22) Filed: Oct. 23, 2018

(65) Prior Publication Data
US 2019/0206035 A1    Jul. 4, 2019

Related U.S. Application Data

(60) Provisional application No. 62/613,419, filed on Jan. 4, 2018.

(30) Foreign Application Priority Data

Apr. 20, 2018   (CN) .......................... 201810357790.7

(51) Int. Cl.
| | | |
|---|---|---|
| G06K 9/00 | (2006.01) |
| G06T 5/20 | (2006.01) |
| G06K 9/40 | (2006.01) |
| G06T 5/00 | (2006.01) |

(52) U.S. Cl.
CPC ............ G06T 5/20 (2013.01); G06K 9/00026 (2013.01); G06K 9/00067 (2013.01); G06K 9/40 (2013.01); G06T 5/002 (2013.01); *G06T 2207/20182* (2013.01)

(58) Field of Classification Search
None
See application file for complete search history.

(56) References Cited

U.S. PATENT DOCUMENTS

| | | |
|---|---|---|
| 6,229,578 B1 | 5/2001 | Acharya et al. |
| 7,734,115 B2 | 6/2010 | Kang et al. |
| 7,936,907 B2 | 5/2011 | Maurer et al. |
| 8,059,910 B2 | 11/2011 | Ishiga |

(Continued)

FOREIGN PATENT DOCUMENTS

| | | |
|---|---|---|
| CN | 103310401 | 9/2013 |
| CN | 105320946 | 2/2016 |

(Continued)

*Primary Examiner* — Hadi Akhavannik
(74) *Attorney, Agent, or Firm* — JCIPRNET (57) ABSTRACT

A biometric image processing method and an electronic device are provided. The biometric image processing method includes the following steps: obtaining a first biometric image; capturing a plurality of grayscale values of a first portion of pixels of the first biometric image and combining the plurality of grayscale values of the first portion of pixels of the first biometric image to generate a first sub-image; performing an image processing procedure on the first sub-image; replacing the plurality of grayscale values of the first portion of pixels of the first biometric image by a plurality of grayscale values of all of the pixels of the first sub-image after the image processing; and performing a mask operation on a plurality of unreplaced grayscale values of other portions of pixels of the first biometric image to generate a second biometric image.

18 Claims, 5 Drawing Sheets

(56) References Cited

U.S. PATENT DOCUMENTS

| | | |
|---|---|---|
| 8,064,721 B2 | 11/2011 | Nicholson |
| 8,682,081 B2 | 3/2014 | Hara |
| 8,798,337 B2 | 8/2014 | Lei et al. |
| 9,715,616 B2 * | 7/2017 | Han .................. G06K 9/00926 |
| 9,836,648 B2 | 12/2017 | Perna et al. |
| 2014/0003677 A1 * | 1/2014 | Han .................. G06K 9/00912 |
| | | 382/124 |
| 2014/0072188 A1 | 3/2014 | Liu et al. |
| 2014/0133711 A1 * | 5/2014 | Abe .................. G06K 9/00067 |
| | | 382/115 |
| 2015/0078633 A1 | 3/2015 | Hung |
| 2017/0323139 A1 | 11/2017 | Wu et al. |

FOREIGN PATENT DOCUMENTS

| | | |
|---|---|---|
| TW | 201115486 | 5/2011 |
| TW | 201428641 | 7/2014 |
| TW | I457842 | 10/2014 |
| TW | I583192 | 5/2017 |

* cited by examiner

FIG. 9

# BIOMETRIC IMAGE PROCESSING METHOD AND ELECTRONIC DEVICE THEREOF

CROSS-REFERENCE TO RELATED APPLICATION

This application claims the priority benefits of U.S. provisional application Ser. No. 62/613,419, filed on Jan. 4, 2018, and China application serial no. 201810357790.7, filed on Apr. 20, 2018. The entirety of each of the above-mentioned patent applications is hereby incorporated by reference herein and made a part of this specification.

BACKGROUND OF THE INVENTION

Field of the Invention

The invention relates to an image processing method, and more particularly, to a biometric image processing method and an electronic device thereof.

Description of Related Art

In recent years, biometric techniques are extensively applied in various electronic devices such as mobile devices and personal computers, and the biometric techniques adopt, for instance, a fingerprint recognition technique, face recognition technique, iris recognition technique, or vein recognition technique. In general, an electronic device provided with a biometric sensing module first obtains an original biometric image, and then optimizes the original biometric image to obtain a biometric image that can be recognized or has better image quality. Next, the electronic device performs a recognition procedure or other application procedures using the biometric image after the image processing.

However, since a regular biometric image processing can perform an image optimization procedure such as an image noise removal procedure, image background removal procedure, image smoothing procedure, or image contrast enhancement procedure on the biometric image, a large number of processing operations and additional memory space are required. In this regard, if the resources of the electronic device are limited, then an effective biometric recognition function cannot be provided. Therefore, solutions on how to reduce the computing resource required for the electronic device to execute biometric image processing are provided below in several embodiments.

SUMMARY OF THE INVENTION

The invention provides a biometric image processing method and an electronic device that can effectively optimize a biometric image.

The biometric image processing method of the invention includes the following steps. A first biometric image is obtained. A plurality of grayscale values of a first portion of pixels of the first biometric image is obtained and the plurality of grayscale values of the first portion of pixels of the first biometric image is combined to generate a first sub-image. An image processing procedure is performed on the first sub-image. The plurality of grayscale values of the first portion of pixels of the first biometric image is replaced by a plurality of grayscale values of all of the pixels of the first sub-image after the image processing. A mask operation is performed on a plurality of unreplaced grayscale values of other portions of pixels of the first biometric image to generate a second biometric image.

The electronic device of the invention includes a sensor and a processor. The sensor is configured to obtain a first biometric image. The processor is coupled to the sensor. The processor is configured to capture a plurality of grayscale values of a first portion of pixels of the first biometric image and combine the plurality of grayscale values of the first portion of pixels of the first biometric image to generate a first sub-image. The processor performs an image processing procedure on the first sub-image and replaces the plurality of grayscale values of the first portion of pixels of the first biometric image with a plurality of grayscale values of all of the pixels of the first sub-image after the image processing. The processor performs a mask operation on a plurality of unreplaced grayscale values of other portions of pixels of the first biometric image to generate a second biometric image.

Based on the above, the biometric image processing method and the electronic device of the invention can generate a sub-image by capturing the grayscale values of a portion of pixels of the original biometric image, then performing an image processing on the sub-image, and then mixing the sub-image after the image processing and the original biometric image at a relative ratio to obtain an optimized biometric image. The biometric image processing method and the electronic device of the invention can effectively optimize the biometric image and can effectively reduce the computing resource required for the electronic device to execute biometric image processing.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

To make the contents of the invention more easily understood, embodiments are provided below as examples of the plausibility of implementation of the invention. Moreover, when applicable, devices/components/steps having the same reference numerals in figures and embodiments represent the same or similar parts.

Figure 1:
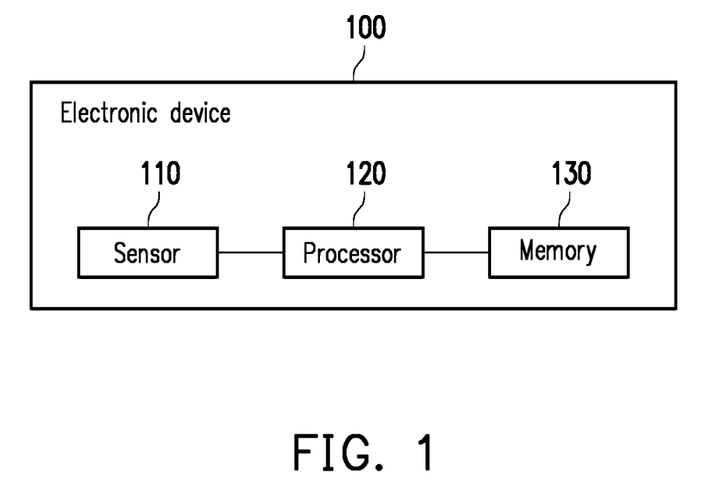
FIG. 1 is a schematic of an electronic device according to an embodiment of the invention.

FIG. 1 is a schematic of an electronic device according to an embodiment of the invention. Referring to FIG. 1, an electronic device 100 includes a sensor 110, a processor 120, and a memory 130. The processor 120 is coupled to the sensor 110 and the memory 130. In the present embodiment, the sensor 110 is configured to sense biometrics and output a biometric image to the processor 120, wherein the biometric image can be a grayscale image. The processor 120 receives the biometric image provided by the sensor 110 and optimizes the biometric image. In the present embodiment, the memory 130 can be configured to store relevant information, image, or data generated in the process of optimizing the biometric image via the processor 120, and the memory 130 can be configured to store an image processing procedure to be read and executed by the processor 120.

Specifically, the processor 120 receives the first biometric image provided by the sensor 110 and captures a plurality of grayscale values of a first portion of pixels of the first biometric image. The processor 120 can combine the grayscale values of the first portion of pixels of the first biometric image to generate a first sub-image. First, in the present embodiment, the processor 120 can perform an image processing procedure on the first sub-image to optimize the first sub-image and replace the grayscale values of the first portion of pixels of the first biometric image with a plurality of grayscale values of all of the pixels of the first sub-image after the image processing (image processed first sub-image). Next, in the present embodiment, the processor 120 can perform a mask operation on a plurality of unreplaced grayscale values of other portions of pixels of the first biometric image to generate a second biometric image.

In other words, the processor 120 of the present embodiment only needs to adjust a portion of pixels of the first biometric image without computing all of the pixels of the first biometric image. Moreover, the processor 120 of the present embodiment 120 can mix the first sub-image after the image processing and the original first biometric image. The processor 120 can perform a mask operation on other portions of pixels that are not replaced of the first biometric image according to the replaced grayscale values of the portion of pixels of the first biometric image to generate a second biometric image. Therefore, the processor 120 of the present embodiment can effectively optimize the first biometric image and can effectively reduce the computing resource of the electronic device 100.

Moreover, in an embodiment, the processor 120 can additionally capture a plurality of grayscale values of a second portion of pixels of the first biometric image. The processor 120 can combine the grayscale values of the second portion of pixels of the first biometric image to generate a second sub-image. Moreover, the processor 120 can perform an image processing procedure on the second sub-image to optimize the second sub-image and replace the grayscale values of the first portion of pixels of the first biometric image with a plurality of grayscale values of all of the pixels of each of the first sub-image and the second sub-image after the image processing (image processed second sub-image). It should be mentioned that, the first portion of pixels of the first biometric image can refer to, for instance, the pixels at each even-number coordinate in the first biometric image, and the second portion of pixels of the first biometric image can refer to, for instance, the pixels of each odd-number coordinate in the first biometric image, but the invention is not limited thereto. The method with which the processor 120 selects the portion of pixels of the first biometric image for image processing can be decided according to the type of different biometrics or different image processing requirements.

In the present embodiment, the sensor 110 can be, for instance, a fingerprint sensor, a face sensor, an iris sensor, or a vein sensor. The sensor 110 can capture an image of a sensing target to output the biometric image to the processor 120. The processor 120 can be a central processing unit (CPU) or other programmable microprocessors for conventional use or special use, a digital signal processor (DSP), programmable controller, application-specific integrated circuit (ASIC), programmable logic device (PLD), other similar processing circuits, or a combination of the circuits.

In the present embodiment, the memory 130 can be a non-transitory computer-readable recording medium. The non-transitory computer-readable recording medium can be, for instance, a read-only memory (ROM), electrically-erasable programmable read-only memory (EPROM), or electrically-erasable programmable read-only memory (EEPROM), and the invention is not particularly limited in this regard.

Figure 2:
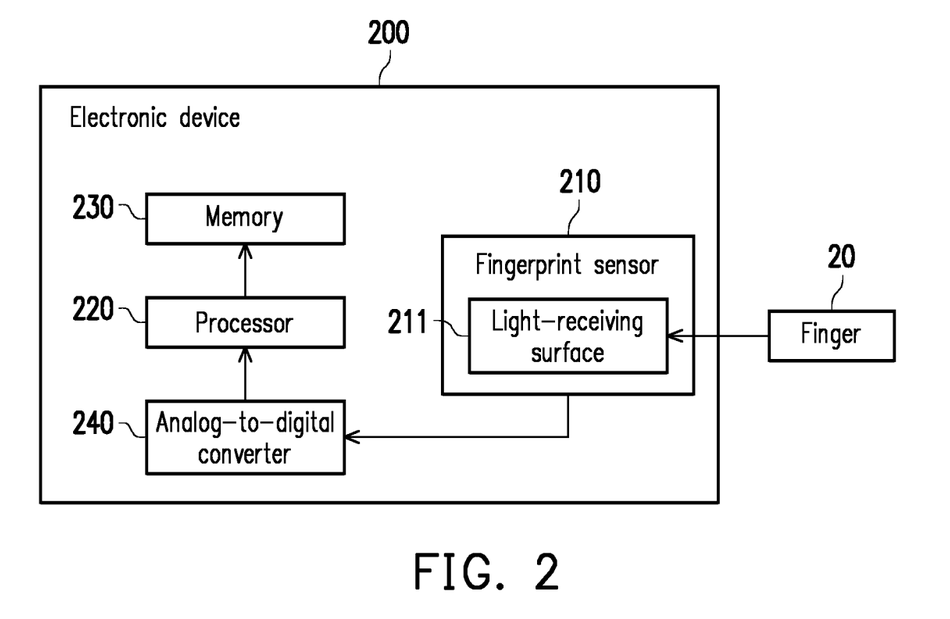
FIG. 2 is a schematic of an electronic device according to another embodiment of the invention.

FIG. 2 is a schematic of an electronic device according to another embodiment of the invention. Referring to FIG. 2, fingerprint sensing is exemplified. An electronic device 200 can include a fingerprint sensor 210, a processor 220, a memory 230, and an analog-to-digital converter 240. The fingerprint sensor 210 is coupled to the digital converter 240. The processor 220 is coupled to the memory 230 and the digital converter 240. In the present embodiment, the fingerprint sensor 210 can include a light-receiving surface 211. When a user places a finger 20 on the light-receiving surface 211, the light source of the fingerprint sensor 210 can emit a visible light or invisible light to the finger 20 such that the light receiver of the fingerprint sensor 210 receives the light reflected by the finger 20 and generates a fingerprint feature image.

In the present embodiment, the fingerprint sensor 210 outputs the fingerprint feature image to the analogue-to-digital converter 240. The analogue-to-digital converter 240 converts the fingerprint feature image provided by the fingerprint sensor 210 into a digital information and outputs the digital information to the processor 220. Therefore, the processor 220 can perform an image processing procedure on a portion of data of the digital-type fingerprint feature image and mix the portion of data after the image processing and other portions of data without the image processing at a relative ratio to optimize the fingerprint feature image. Moreover, the processor 220 can store the optimized fingerprint feature image in the memory 230 or compare the optimized fingerprint feature image and registered data in the memory 230 to perform fingerprint recognition.

In the present embodiment, other embodiments of the fingerprint sensor 210, the processor 220, and the memory 230 and image processing details are provided in the embodiment of FIG. 1 and sufficient teaching, suggestion, and implementation instructions can be obtained, and the other embodiments and image processing details are therefore not repeated herein.

Figure 3:
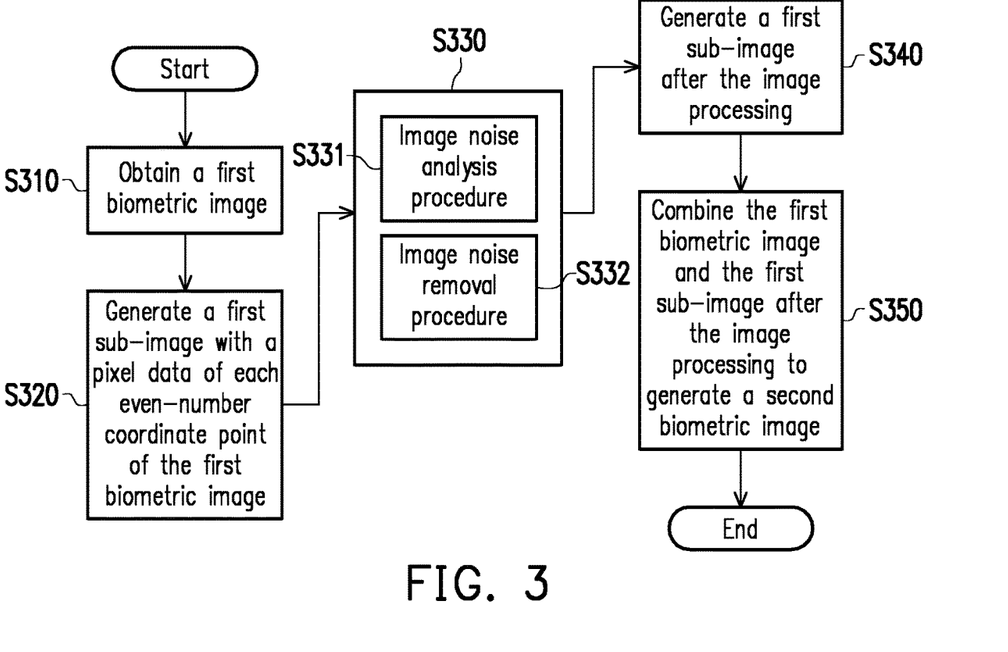
FIG. 3 is a flowchart of a biometric image processing method according to the first embodiment of the invention.

FIG. 3 is a flowchart of a biometric image processing method according to the first embodiment of the invention. Referring to FIG. 1 and FIG. 3, the biometric image processing method of FIG. 3 can be adapted for the electronic device 100 of FIG. 1. In step S310, the sensor 110 obtains a first biometric image. In step S320, the processor 120 generates a first sub-image with grayscale values of pixels of each even-number coordinate of the first biometric image.

The even-number coordinates are, for instance, (0,0), (2,2), (4,4) . . . etc. In step S330, the processor 120 performs an image processing procedure on the first sub-image. In step S330, the processor 120 can perform an image noise analysis procedure on the first sub-image (step S331) and perform an image noise removal procedure on the first sub-image according to the analyzed result (step S332). In step S340, the processor 120 generates a first sub-image after the image processing. In step S350, the processor 120 combines the first biometric image and the first sub-image after the image processing to generate a second biometric image. In other words, the processor 120 can optimize the first biometric image to obtain a second biometric image having better image quality. Moreover, in comparison to processing all of the pixels of the first biometric image, the method with which the processor 120 of the present embodiment optimizes the first sub-image only requires a quarter of the computing resource and memory space.

Specifically, in step S330, the image noise analysis procedure (step S331) and the image noise removal procedure (step S332) include, for instance, performing an image smoothing processing on the first sub-image, such as using a Gaussian smoothing filter. In step S350, the processor 120 mixes the first sub-image after the image smoothing processing and the first biometric image. In the present embodiment, the processor 120 replaces the grayscale values of the pixels of each even-number coordinate of the original first biometric image with the grayscale values of all of the pixels of the first sub-image after the image smoothing processing, and the processor 120 performs a mask operation on the other unreplaced pixels in the first biometric image. In the present embodiment, the mask operation includes performing a weighted-average operation on the grayscale values of a target pixel (other unreplaced pixels) and a plurality of adjacent pixels around the target pixel in the first biometric image according to a computing mask to adjust the grayscale values of the target pixel. Moreover, the weighted values of the portion of pixels corresponding to even-number coordinates in the adjacent pixels are greater than the weighted values of other portions of pixels of the adjacent pixels. For instance, the weight of the pixels corresponding to even-number coordinates in the adjacent pixels can be 4, and the weight of pixels of other non-even-number coordinates can be 1. Therefore, the processor 120 of the present embodiment can effectively optimize the biometric image.

Figure 4:
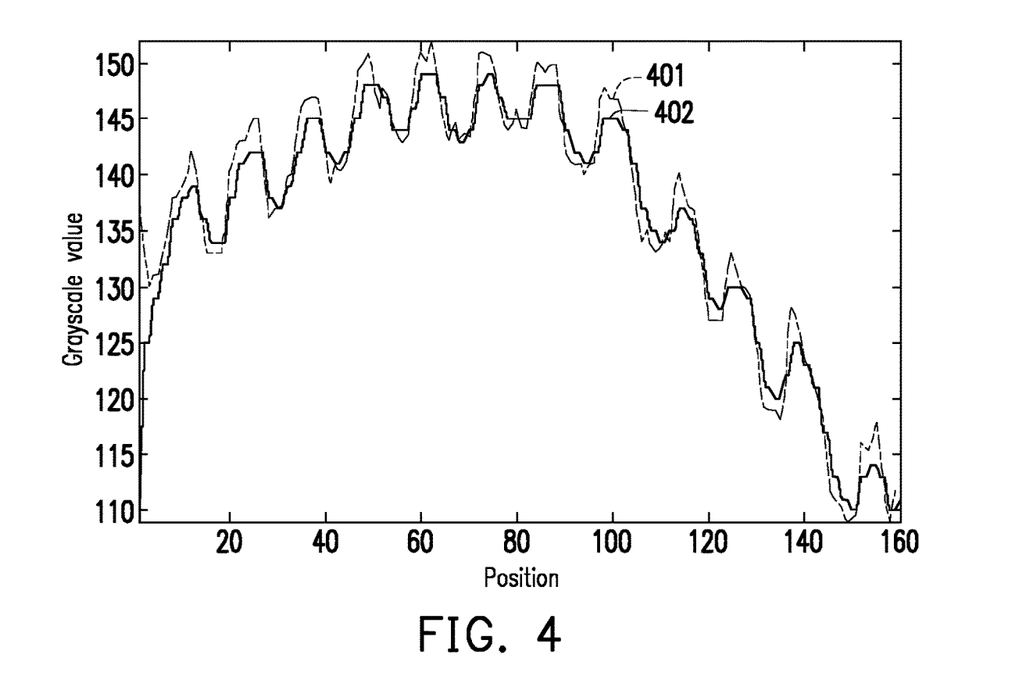
FIG. 4 is a grayscale change chart of the biometric image according to the embodiment of FIG. 3.

FIG. 4 is a grayscale change chart of the biometric image according to the embodiment of FIG. 3. Referring to FIG. 1, FIG. 3, and FIG. 4, the image processing result of a one-dimensional fingerprint image is exemplified. For instance, the sensor 110 can sense fingerprint features and provide a 160 pixel×160 pixel fingerprint image to the processor 120. The processor 120 can optimize the 160 pixel×160 pixel fingerprint image according to the biometric image processing method of the embodiment of FIG. 3. The processor 120 can capture each pixel of the even-number coordinates in the 160 pixel×160 pixel fingerprint image to generate an 80 pixel×80 pixel first sub-image. The processor 120 can perform an image smoothing processing on the 80 pixel×80 pixel first sub-image and replace the pixels of even-number coordinates of the fingerprint image with all of the pixels of the first sub-image after the image smoothing processing. The processor 120 performs a mask operation on the other portions of pixels that are not replaced in the fingerprint image to optimize the fingerprint image.

Therefore, as shown in FIG. 4, a curve 401 (dotted line) represents a one-dimensional grayscale value change in the fingerprint image without the image processing, and a curve 402 (solid line) represents a one-dimensional grayscale value change of the fingerprint image of the image processing. Comparing the curve 401 and the curve 402, the grayscale value change of the image processing is smoother. In other words, the processor 120 of the present embodiment can effectively optimize the fingerprint image and can effectively reduce the computing resource of the electronic device 100. Moreover, the optimized fingerprint image can be, for instance, configured for fingerprint recognition or fingerprint analysis, and can also increase fingerprint recognition quality or provide good fingerprint analysis result.

Figure 5:
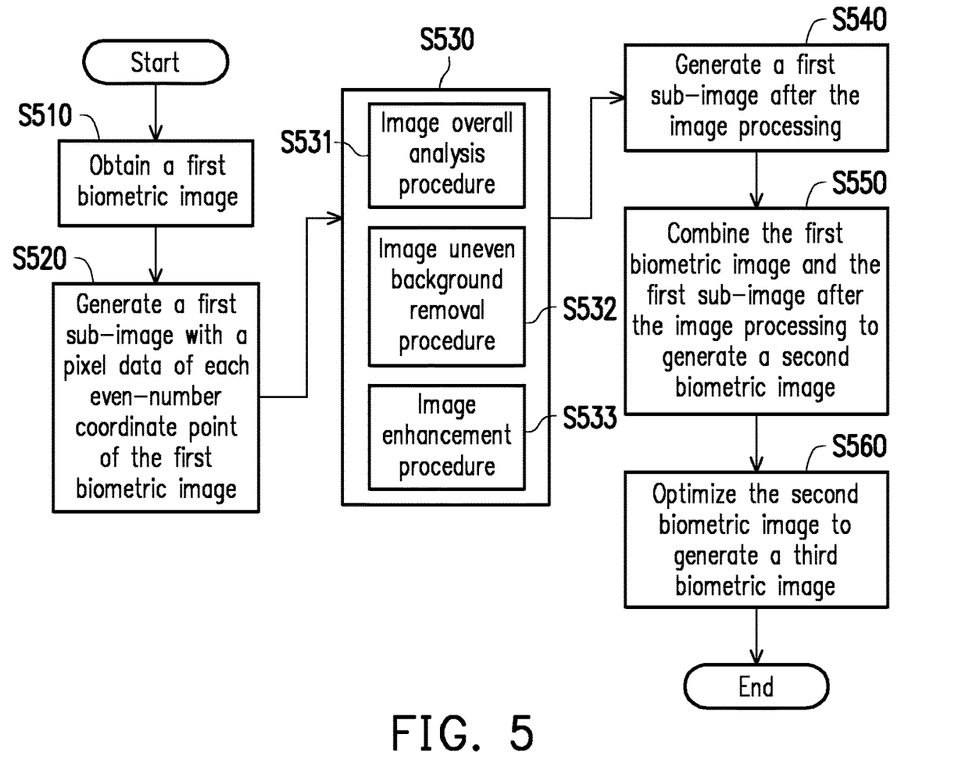
FIG. 5 is a flowchart of a biometric image processing method according to the second embodiment of the invention.

FIG. 5 is a flowchart of a biometric image processing method according to the second embodiment of the invention. Referring to FIG. 1 and FIG. 5, the biometric image processing method of FIG. 5 can be adapted for the electronic device 100 of FIG. 1. In step S510, the sensor 110 obtains a first biometric image. In step S520, the processor 120 generates a first sub-image with the grayscale values of the pixels of each even-number coordinate of the first biometric image. The even-number coordinates are, for instance, (0,0), (2,2), (4,4) . . . etc. In step S530, the processor 120 performs an image processing procedure on the first sub-image. In step S530, the processor 120 can perform an image overall analysis procedure on the first sub-image (step S531) and perform an image uneven background removal procedure on the first sub-image according to the analyzed result (step S532), and lastly perform an image enhancement procedure on the first sub-image (step S533). In step S540, the processor 120 generates a first sub-image after the image processing. In step S550, the processor 120 combines the first biometric image and the first sub-image after the image processing to generate a second biometric image. In step S560, the processor 120 further optimizes the second biometric image to generate a third biometric image. In other words, the processor 120 can optimize the first biometric image to obtain a second biometric image having better image quality and optimizes the second biometric image again to obtain a third biometric image having better image quality. Moreover, in comparison to processing all of the pixels of the first biometric image, the method with which the processor 120 of the present embodiment optimizes the first sub-image only requires a quarter of the computing resource and memory space.

Specifically, in step S530, the image overall analysis procedure (S531) and the image uneven background removal procedure (step S532) include, for instance, performing an image background removal process such as Gaussian background removal or rolling ball background removal on the first sub-image. The image enhancement procedure (step S533) includes, for instance, performing equal-ratio linear scale contrast stretch or histogram equalization on the first sub-image. In step S550, the processor 120 mixes the first sub-image after the image background removal processing and the first biometric image. In the present embodiment, the processor 120 replaces the grayscale values of the pixels of each even-number coordinate of the original first biometric image with the grayscale values of all of the pixels of the first sub-image after the image background removal processing, and the processor 120 performs a mask operation on the other unreplaced pixels in the first biometric image. In the present embodiment, the mask operation includes performing a weighted-average operation on the grayscale values of a target pixel (other unreplaced pixels) and a plurality of adjacent pixels around the target pixel in the first biometric image according to a computing mask to adjust the grayscale values of the target pixel. Moreover, the weighted values of the portion of pixels corresponding to even-number coordinates or odd-number coordinates in the adjacent pixels are greater than the weighted value of the target pixel, and the weighted value of the target pixel is greater than weighted values of the other portions of pixels of the adjacent pixels. For instance, the computing mask can adopt, for instance, the matrix of formula (1) below. In the following formula (1), W0, W1, W2, and W3 are weighted values. The weighted value W0 corresponds to the target pixel. The weighted value W1 corresponds to, for instance, an adjacent pixel of an even-number coordinate or odd-number coordinate. The weighted value V1 is greater than the weighted value W0, and the weighted value W0 is greater than the weighted values W2 and W3. Formula (1) is as follows:

$$\frac{1}{(W0 + 2W1 + 2W2 + 4W3)} \begin{bmatrix} W3 & W2 & W3 \\ W1 & W0 & W1 \\ W3 & W2 & W3 \end{bmatrix} \quad \text{formula (1)}$$

In step S560, the processor 120 can further optimize the second biometric image to generate a third biometric image. In the present embodiment, the processor 120 can perform a noise removal procedure and an overall brightness adjustment procedure on the second biometric image. The noise removal procedure can include, for instance, using a Gaussian smoothing filter or a Median filter on the second biometric image. The overall brightness adjustment procedure can adopt, for instance, equal-ratio linear scale contrast stretch or histogram equalization on the second biometric image to enhance image contrast. Therefore, the processor 120 of the present embodiment can effectively optimize the biometric image.

Figure 6:
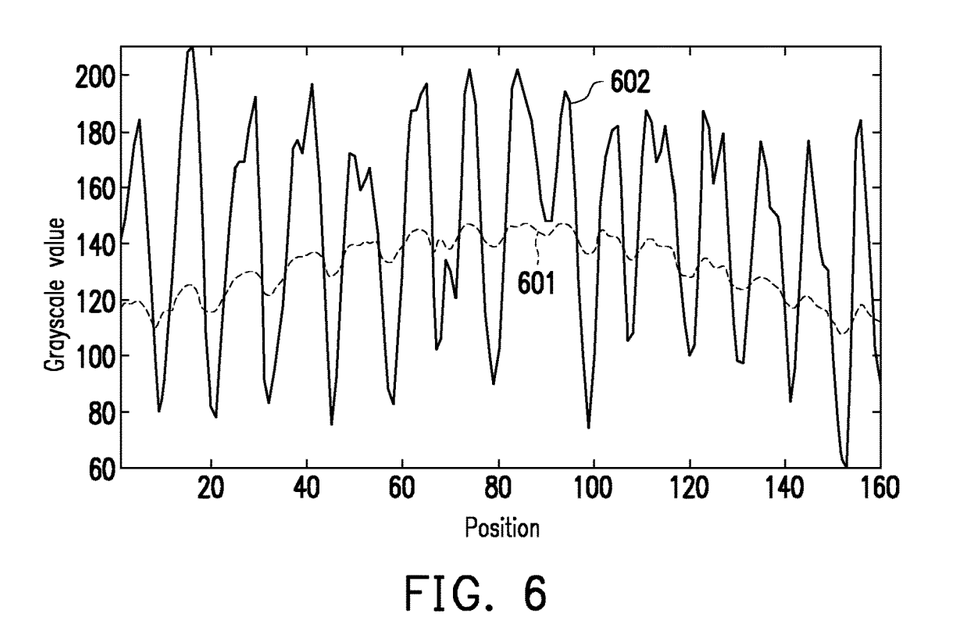
FIG. 6 is a grayscale change chart of the biometric image according to the embodiment of FIG. 5.

FIG. 6 is a grayscale change chart of the biometric image according to the embodiment of FIG. 5. Referring to FIG. 1, FIG. 5, and FIG. 6, the image processing result of a one-dimensional fingerprint image is exemplified. For instance, the sensor 110 can sense fingerprint features and provide a 160 pixel×160 pixel fingerprint image to the processor 120. The processor 120 can optimize the 160 pixel×160 pixel fingerprint image according to the biometric image processing method of the embodiment of FIG. 5. The processor 120 can capture each pixel of the even-number coordinates in the 160 pixel×160 pixel fingerprint image to generate an 80 pixel×80 pixel first sub-image. The processor 120 can perform an image background removal processing on the 80 pixel×80 pixel first sub-image and replace the pixels of even-number coordinates of the fingerprint image with all of the pixels of the first sub-image after the image background removal processing. The processor 120 performs a mask operation on the other portions of pixels that are not replaced in the fingerprint image to optimize the fingerprint image. The processor 120 further performs simple noise removal and overall brightness adjustment on the optimized fingerprint image.

Therefore, as shown in FIG. 6, a curve 601 (dotted line) represents a one-dimensional grayscale value change in the fingerprint image without the image processing, and a curve 602 (solid line) represents a one-dimensional grayscale value change of the fingerprint image of the image processing. Comparing the curve 601 and the curve 602, after the image processing above, since redundant background information of the fingerprint image is removed and the contrast of the fingerprint image is enhanced, the grayscale value change after the image processing above is more significant. In other words, the processor 120 of the present embodiment can effectively optimize the fingerprint image and can effectively reduce the computing resource of the electronic device 100. Moreover, the optimized fingerprint image can be, for instance, configured for fingerprint recognition or fingerprint analysis, and can also increase fingerprint recognition quality or provide good fingerprint analysis result.

Figure 7:
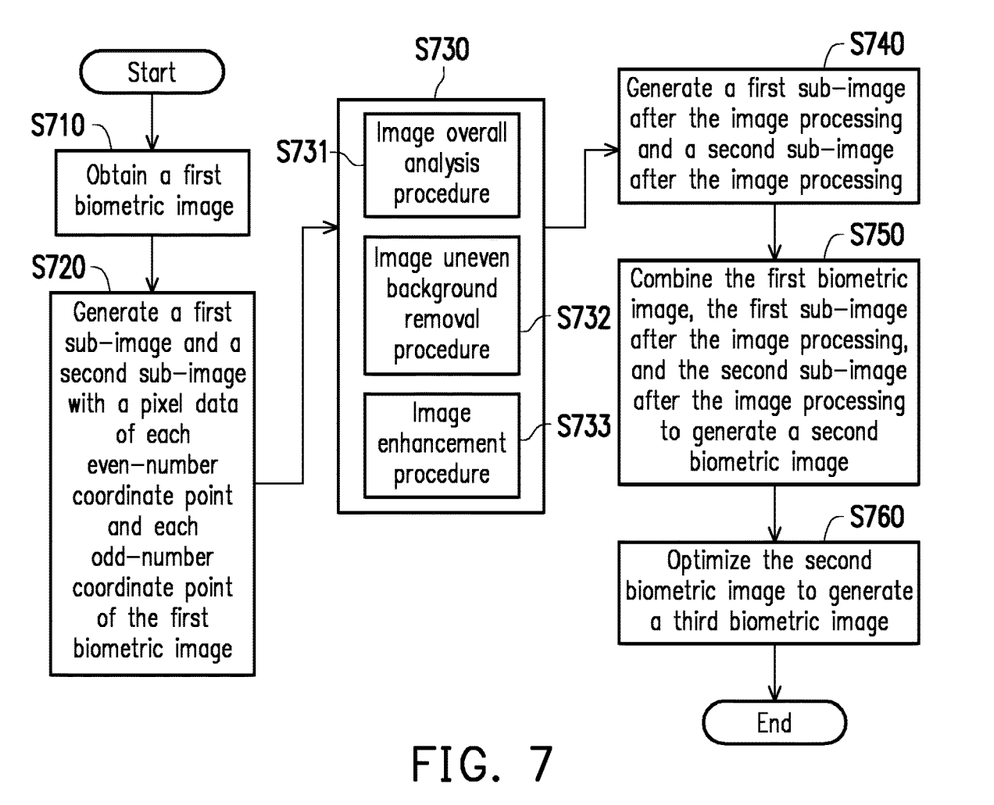
FIG. 7 is a flowchart of a biometric image processing method according to the third embodiment of the invention.

FIG. 7 is a flowchart of a biometric image processing method according to the third embodiment of the invention. Referring to FIG. 1 and FIG. 7, the biometric image processing method of FIG. 7 can be adapted for the electronic device 100 of FIG. 1. In step S710, the sensor 110 obtains a first biometric image. In step S720, the processor 120 generates a first sub-image with the grayscale value of the pixel of each even-number coordinate of the first biometric image, and the processor 120 generates a second sub-image with the grayscale value of the pixel of each odd-number coordinate of the first biometric image. The even-number coordinates are, for instance, (0,0), (2,2), (4,4) . . . etc., and the odd-number coordinates are, for instance, (1,1), (3,3), (5,5) . . . etc. In step S730, the processor 120 performs an image processing procedure on the first sub-image and the second sub-image. In step S730, the processor 120 can perform an image overall analysis procedure on the first sub-image (step S731) and perform an image uneven background removal procedure on the first sub-image according to the analyzed result (step S732), and lastly perform an image enhancement procedure on the first sub-image (step S733). In step S740, the processor 120 generates a first sub-image after the image processing and a second sub-image after the image processing. In step S750, the processor 120 combines the first biometric image and the first sub-image after the image processing and the second sub-image after the image processing to generate a second biometric image. In step S760, the processor 120 further optimizes the second biometric image to generate a third biometric image. In other words, the processor 120 can optimize the first biometric image to obtain a second biometric image having better image quality and optimizes the second biometric image again to obtain a third biometric image having better image quality. Moreover, in comparison to processing all of the pixels of the first biometric image, the method with which the processor 120 of the present embodiment optimizes the first sub-image and the second sub-image only requires half of the computing resource and memory space.

Specifically, in step S730, the image overall analysis procedure (S731) and the image uneven background removal procedure (step S732) include, for instance, performing an image background removal process such as Gaussian background removal or rolling ball background removal on the first sub-image and the second sub-image. The image enhancement procedure (step S733) include, for instance, performing equal-ratio linear scale contrast stretch or histogram equalization respectively on the first sub-image and the second sub-image. In step S750, the processor 120 mixes the first sub-image and the second sub-image after the image background removal processing and the first biometric image. In the present embodiment, the processor 120 replaces the grayscale values of the pixels of each even-number coordinate of the original first biometric image with the grayscale values of all of the pixels of the first sub-image after the image background removal processing, and the processor 120 replaces the grayscale value of the pixel of each odd-number coordinate of the original first biometric image with the grayscale values of all of the pixels of the second sub-image after the image background removal processing. The processor 120 performs a mask operation on the other unreplaced pixels in the first biometric image. In the present embodiment, the mask operation includes performing a weighted-average operation on the grayscale values of a target pixel (other unreplaced pixels) and a plurality of adjacent pixels around the target pixel in the first biometric image according to a computing mask to adjust the grayscale values of the target pixel. Moreover, in the computing mask, a plurality of weighted values of the target pixel and a plurality of adjacent pixels around the target pixel can be, for instance, decided according to a fourth-order binomial. For instance, the computing mask can adopt, for instance, the matrix of formula (2) below. In formula (2), the weighted value of the target pixel is 36, and the weighted values of the adjacent pixels around the target pixel are reduced with an increase in the distance from the target pixel. Formula (2) is as follows:

$$\frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix} \quad \text{formula (2)}$$

In step S760, the processor 120 can further optimize the second biometric image to generate a third biometric image. In the present embodiment, the processor 120 can perform a noise removal procedure and an overall brightness adjustment procedure on the second biometric image. The noise removal procedure can include, for instance, using a Gaussian smoothing filter or a Median filter on the second biometric image. The overall brightness adjustment procedure can adopt, for instance, equal-ratio linear scale contrast stretch or histogram equalization on the second biometric image to enhance image contrast. Therefore, the processor 120 of the present embodiment can effectively optimize the biometric image.

Figure 8:
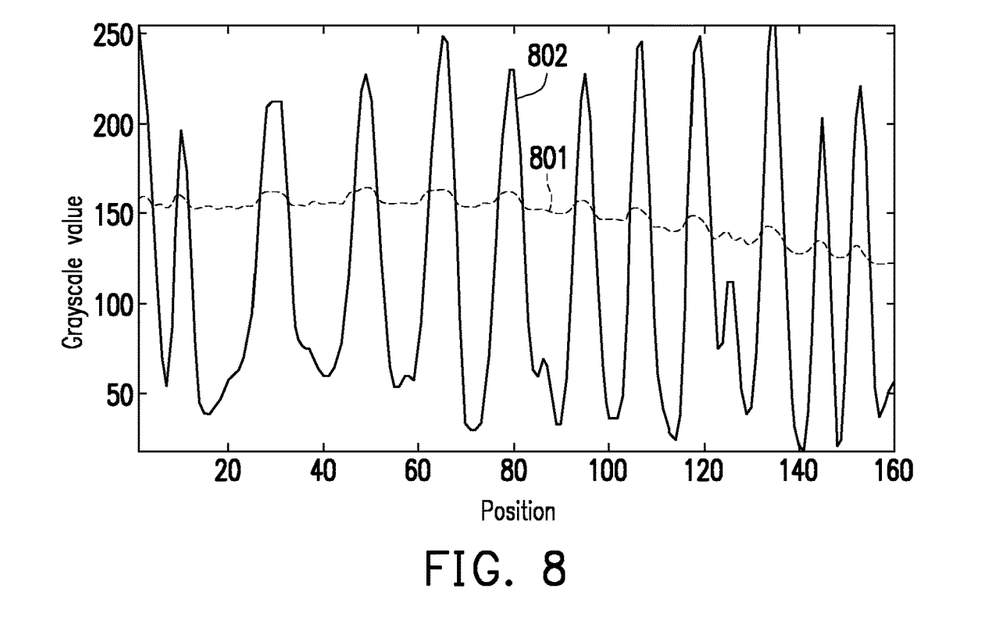
FIG. 8 is a grayscale change chart of the biometric image according to the embodiment of FIG. 7.

FIG. 8 is a grayscale change chart of the biometric image according to the embodiment of FIG. 7. Referring to FIG. 1, FIG. 7, and FIG. 8, the image processing result of a one-dimensional fingerprint image is exemplified. For instance, the sensor 110 can sense fingerprint features and provide a 160 pixel×160 pixel fingerprint image to the processor 120. The processor 120 can optimize the 160 pixel×160 pixel fingerprint image according to the biometric image processing method of the embodiment of FIG. 7. The processor 120 can capture each pixel of the even-number coordinates in the 160 pixel×160 pixel fingerprint image to generate an 80 pixel×80 pixel first sub-image, and the processor 120 can capture each pixel of the odd-number coordinates in the 160 pixel×160 pixel fingerprint image to generate an 80 pixel×80 pixel second sub-image. The processor 120 can perform an image background removal processing on the 80 pixel×80 pixel first sub-image and second sub-image and replace the pixels of even-number coordinates and odd-number coordinates of the fingerprint image with all of the pixels of each of the first sub-image and second sub-image after the image background removal processing. The processor 120 performs a mask operation on the other portions of pixels that are not replaced in the fingerprint image to optimize the fingerprint image. The processor 120 further performs simple noise removal and overall brightness adjustment on the optimized fingerprint image.

Therefore, as shown in FIG. 8, a curve 801 (dotted line) represents a one-dimensional grayscale value change in the fingerprint image without the image processing, and a curve 802 (solid line) represents a one-dimensional grayscale value change of the fingerprint image of the image processing. Comparing the curve 801 and the curve 802, after the image processing above, since redundant background information of the fingerprint image is removed and the contrast of the fingerprint image is enhanced, the grayscale value change after the image processing above is more significant. In other words, the processor 120 of the present embodiment can effectively optimize the fingerprint image and can effectively reduce the computing resource of the electronic device 100. Moreover, the optimized fingerprint image can be, for instance, configured for fingerprint recognition or fingerprint analysis, and can also increase fingerprint recognition quality or provide good fingerprint analysis result.

Figure 9:
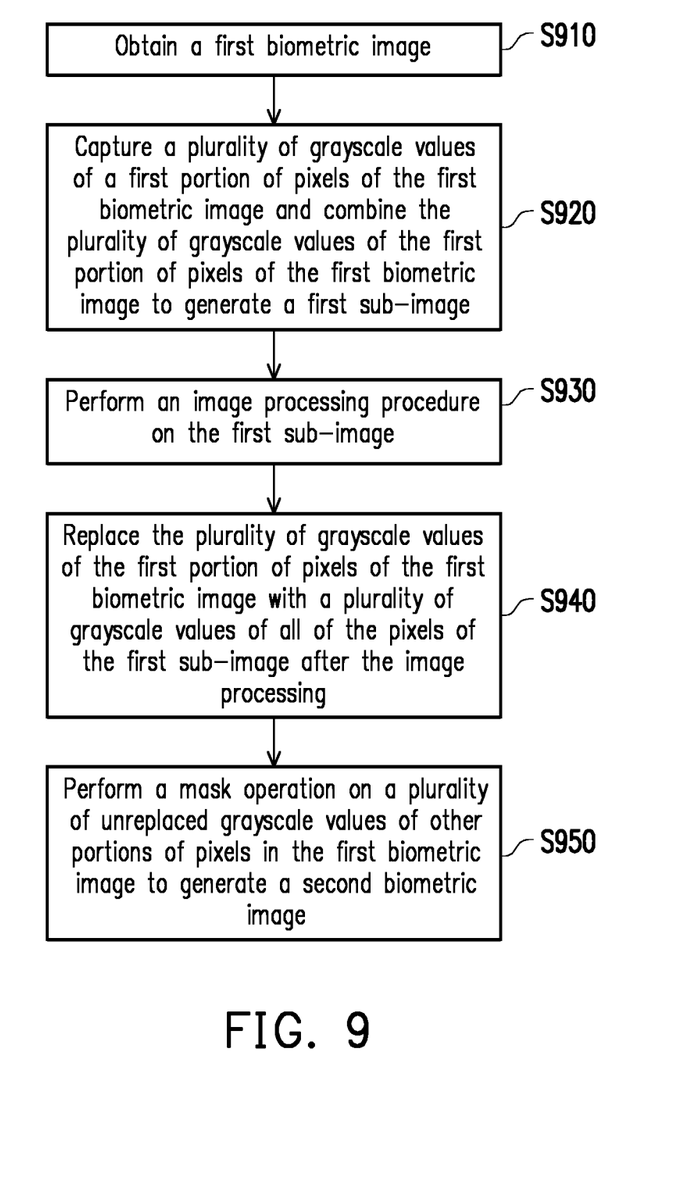
FIG. 9 is a flowchart of a biometric image processing method according to another embodiment of the invention.

FIG. 9 is a flowchart of a biometric image processing method according to another embodiment of the invention. Referring to FIG. 1 and FIG. 9, the biometric image processing method of the present embodiment can at least be adapted to the electronic device 100 of the embodiment of FIG. 1. In step S910, the sensor 110 obtains a first biometric image. In step S920, the processor 120 captures a plurality of grayscale values of a first portion of pixels of the first biometric image and combines the plurality of grayscale value of the first portion of pixels of the first biometric image to generate a first sub-image. In step S930, the processor 120 performs an image processing procedure on the first sub-image. In step S940, the processor 120 replaces the plurality of grayscale values of the first portion of pixels of the first biometric image with a plurality of grayscale values of all of the pixels of the first sub-image after the image processing. In step S950, the processor 120 performs a mask operation on a plurality of unreplaced grayscale values of other portions of pixels of the first biometric image to generate a second biometric image. Therefore, the processor 120 can effectively optimize the first biometric image to obtain a second biometric image having better image quality.

Based on the above, the biometric image processing method and the electronic device of the invention can generate a sub-image by first capturing the grayscale values of a portion of pixels of the original biometric image, then optimizing the sub-image, and then replacing the grayscale values of the portion of pixels in the original biometric image with the grayscale values of all of the pixels of the optimized sub-image. Next, the biometric image processing method and the electronic device of the invention can perform a mask operation on the plurality of unreplaced pixels in the biometric image to mix the optimized sub-image and the original biometric image at a relative ratio. The biometric image processing method and the electronic device of the invention can effectively optimize the biometric image and can effectively reduce the computing resource required for the electronic device to execute biometric image processing.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A biometric image processing method, comprising:
obtaining a first biometric image;
capturing a plurality of grayscale values of a first portion of pixels of the first biometric image and combining the grayscale values of the first portion of pixels of the first biometric image to generate a first sub-image, wherein the first portion of pixels of the first biometric image are pixels of each even-number coordinate or each odd-number coordinate of the first biometric image;

performing an image processing procedure on the first sub-image;

replacing the grayscale values of the first portion of pixels of the first biometric image with a plurality of grayscale values of all of the pixels of the first sub-image after the image processing; and performing a mask operation on a plurality of unreplaced grayscale values of other portions of pixels of the first biometric image to generate a second biometric image.

2. The biometric image processing method of claim 1, wherein the mask operation comprises:

performing a weighted-average operation on grayscale values of a target pixel and a plurality of adjacent pixels around the target pixel in the first biometric image according to a computing mask to adjust the grayscale value of the target pixel.

3. The biometric image processing method of claim 2, wherein weighted values of a portion of pixels corresponding to even-number coordinates or odd-number coordinates in the adjacent pixels are greater than weighted values of other portions of pixels of the adjacent pixels.

4. The biometric image processing method of claim 3, wherein the weighted values of the portion of pixels corresponding to the even-number coordinates or the odd-number coordinates in the adjacent pixels are greater than a weighted value of the target pixel, and the weighted value of the target pixel is greater than the weighted values of the other portions of pixels of the adjacent pixels.

5. The biometric image processing method of claim 2, wherein a plurality of weighted values of the target pixel and the plurality of adjacent pixels around the target value are decided according to a fourth-order binomial.

6. The biometric image processing method of claim 1, wherein the image processing procedure comprises at least one of an image noise removal procedure, an image uneven background removal procedure, and an image enhancement procedure.

7. The biometric image processing method of claim 1, further comprising:

capturing a plurality of grayscale values of a second portion of pixels of the first biometric image and combining the grayscale values of the second portion of pixels of the first biometric image to generate a second sub-image;

performing the image processing procedure on the second sub-image; and replacing the grayscale values of the second portion of pixels of the first biometric image with a plurality of grayscale values of all of the pixels of the second sub-image after the image processing.

8. The biometric image processing method of claim 7, wherein the first portion of pixels and the second portion of pixels of the first biometric image are pixels of each even-number coordinate and each odd-number coordinate of the first biometric image.

9. The biometric image processing method of claim 1, further comprising:

performing an overall brightness adjustment procedure on the second biometric image to generate a third biometric image.

10. An electronic device, comprising:

a sensor configured to obtain a first biometric image; and a processor coupled to the sensor and configured to capture a plurality of grayscale values of a first portion of pixels of the first biometric image and combine the grayscale values of the first portion of pixels of the first biometric image to generate a first sub-image, wherein the first portion of pixels of the first biometric image are pixels of each even-number coordinate or each odd-number coordinate of the first biometric image, wherein the processor performs an image processing procedure on the first sub-image and replaces the grayscale values of the first portion of pixels of the first biometric image with a plurality of grayscale values of all of the pixels of the first sub-image after the image processing, wherein the processor performs a mask operation on a plurality of unreplaced grayscale values of other portions of pixels of the first biometric image to generate a second biometric image.

11. The electronic device of claim 10, wherein the mask operation comprises performing a weighted-average operation on grayscale values of a target pixel and a plurality of adjacent pixels around the target pixel in the first biometric image via the processor according to a computing mask to adjust the grayscale value of the target pixel.

12. The electronic device of claim 11, wherein weighted values of a portion of pixels corresponding to even-number coordinates or odd-number coordinates in the adjacent pixels are greater than weighted values of other portions of pixels of the adjacent pixels.

13. The electronic device of claim 12, wherein the weighted values of the portion of pixels corresponding to the even-number coordinates or the odd-number coordinates in the adjacent pixels are greater than a weighted value of the target pixel, and the weighted value of the target pixel is greater than the weighted values of the other portions of pixels of the adjacent pixels.

14. The electronic device of claim 11, wherein a plurality of weighted values of the target pixel and the plurality of adjacent pixels around the target value are decided according to a fourth-order binomial.

15. The electronic device of claim 10, wherein the image processing procedure comprises at least one of an image noise removal procedure, an image uneven background removal procedure, and an image enhancement procedure.

16. The electronic device of claim 10, wherein the processor captures a plurality of grayscale values of a second portion of pixels of the first biometric image and combines the grayscale values of the second portion of pixels of the first biometric image to generate a second sub-image, wherein the processor performs the image processing procedure on the second sub-image and replaces the grayscale values of the second portion of pixels of the first biometric image with a plurality of grayscale values of all of the pixels of the second sub-image after the image processing.

17. The electronic device of claim 16, wherein the first portion of pixels and the second portion of pixels of the first biometric image are pixels of each even-number coordinate and each odd-number coordinate of the first biometric image.

18. The electronic device of claim 10, wherein the processor performs an overall brightness adjustment procedure on the second biometric image to generate a third biometric image.

* * * * *